(12) United States Patent
Iimori et al.

(10) Patent No.: US 12,436,515 B2
(45) Date of Patent: Oct. 7, 2025

(54) CONTROL APPARATUS, CONTROLLER, CONTROL SYSTEM, CONTROL METHOD, AND COMPUTER-READABLE MEDIUM HAVING RECORDED THEREON CONTROL PROGRAM

(71) Applicant: Yokogawa Electric Corporation, Tokyo (JP)

(72) Inventors: Naohiko Iimori, Tokyo (JP); Go Takami, Tokyo (JP); Shuhei Ishino, Tokyo (JP); Go Misawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 994 days.

(21) Appl. No.: 17/450,560

(22) Filed: Oct. 12, 2021

(65) Prior Publication Data

US 2022/0121164 A1 Apr. 21, 2022

(30) Foreign Application Priority Data

Oct. 16, 2020 (JP) ................................ 2020-174469

(51) Int. Cl.
*G05B 19/045* (2006.01)
*G05B 19/05* (2006.01)
*G06N 20/00* (2019.01)

(52) U.S. Cl.
CPC ........... *G05B 19/045* (2013.01); *G05B 19/05* (2013.01); *G06N 20/00* (2019.01)

(58) Field of Classification Search
CPC .... G05B 19/045; G05B 19/05; G05B 13/042; G05B 17/02; G05B 13/0265;
(Continued)

(56) References Cited

U.S. PATENT DOCUMENTS

2009/0112335 A1* 4/2009 Mehta .................... G05B 17/02
700/29
2016/0103475 A1* 4/2016 Lee .................. G05B 19/41885
700/291

(Continued)

FOREIGN PATENT DOCUMENTS

CN 107346119 A 11/2017
EP 2045673 A2 4/2009

(Continued)

OTHER PUBLICATIONS

Extended European Search Report for European Patent Application No. 21202370.9, issued by the European Patent Office on Feb. 15, 2022.

(Continued)

*Primary Examiner* — Ziaul Karim

(57) ABSTRACT

Provided is a control system comprising a control apparatus including a learning processing unit for generating a control model by learning, the control model being for calculating control data for controlling a facility according to state data detected by at least one sensor for measuring a state of the facility, and a model transmission unit for transmitting the generated control model to a controller for controlling the facility; and a controller including a model receiving unit for (Continued)

receiving the learned control model from the control apparatus, a state receiving unit for receiving the state data from the at least one sensor, a calculation unit for calculating control data for controlling the facility according to the state data, which is a processing target, by using the control model received by the model receiving unit, and a control unit for controlling the facility by using the calculated control data.

8 Claims, 7 Drawing Sheets

(58) Field of Classification Search
CPC .... G05B 19/41865; G05B 2219/32252; G05B 23/0243; G05B 19/418; G05B 23/0221; G06N 20/00
See application file for complete search history.

(56) References Cited

U.S. PATENT DOCUMENTS

| | | | |
|---|---|---|---|
| 2016/0201934 A1 | 7/2016 | Hester | |
| 2016/0209817 A1 | 7/2016 | Kameda | |
| 2018/0181089 A1* | 6/2018 | Fuji | G05B 13/042 |
| 2019/0033840 A1* | 1/2019 | Fujita | G05B 23/0221 |
| 2019/0072916 A1* | 3/2019 | Fuji | G06N 3/126 |
| 2019/0265686 A1* | 8/2019 | Obata | G05B 19/4188 |
| 2019/0339687 A1* | 11/2019 | Cella | G05B 13/028 |
| 2020/0057416 A1* | 2/2020 | Matsubara | G06N 20/10 |
| 2020/0133257 A1* | 4/2020 | Cella | G05B 19/4183 |
| 2020/0285204 A1* | 9/2020 | Iwane | G06N 20/00 |
| 2020/0301375 A1* | 9/2020 | Düll | G05B 17/02 |

FOREIGN PATENT DOCUMENTS

| | | |
|---|---|---|
| JP | 2019159675 A | 9/2019 |
| JP | 2020027556 A | 2/2020 |
| JP | 2020101358 A | 7/2020 |
| KR | 20190028982 A | 3/2019 |
| KR | 20200052403 A | 5/2020 |
| WO | 2014172374 A1 | 10/2014 |
| WO | 2015037165 A1 | 3/2015 |

OTHER PUBLICATIONS

Office Action issued for counterpart Korean Application 10-2021-0137745, issued by the Korean Intellectual Property Office on Dec. 27, 2022.
Office Action issued for counterpart Japanese Application No. 2020-174469, issued by the Japanese Patent Office on Feb. 14, 2023 (drafted on Feb. 9, 2023).
Office Action issued for counterpart European Application No. 21202370.9, issued by the European Patent Office on Dec. 12, 2022.
Office Action issued for counterpart Chinese Application 202111202370. X, issued by The State Intellectual Property Office of People's Republic of China on Feb. 8, 2025.

* cited by examiner

| CONTROL MODEL ID | CONTROLLER ID | CONTROL TARGET ID | CHARACTERISTIC | | |
| --- | --- | --- | --- | --- | --- |
| | | | CERTAINTY | CALCULATION AMOUNT | LEARNING DATE AND TIME |
| 1 | C1 | DEVICE 1a | 0.9 | 100 | 2020/9/18 |
| 2 | C1 | DEVICE 1a | 0.8 | 20 | 2020/9/20 |
| ... | ... | ... | ... | ... | ... |

*FIG. 5*

CONTROL APPARATUS, CONTROLLER, CONTROL SYSTEM, CONTROL METHOD, AND COMPUTER-READABLE MEDIUM HAVING RECORDED THEREON CONTROL PROGRAM

The contents of the following Japanese patent application(s) are incorporated herein by reference:
NO. 2020-174469 filed in JP on Oct. 16, 2020

BACKGROUND

1. Technical Field

The present invention relates to a control apparatus, a controller, a control system, a control method, and a computer-readable medium having recorded thereon a control program.

2. Related Art

Patent Document 1 discloses an apparatus connected to each device in a facility via a network and comprising a plurality of agents configured to set some devices among a plurality of devices provided in the facility to be target devices, wherein each of the plurality of agents executes learning processing for a model that outputs recommended control condition data indicative of a control condition recommended for each target device (claim 1, paragraph 0024, FIG. 1, etc.)

CITATION LIST

Patent Document

Patent Document 1: Japanese Patent Application Publication No. 2020-27556

SUMMARY

A first aspect of the present invention provides a control apparatus. The control apparatus may comprise a state acquisition unit configured to acquire state data detected by at least one sensor configured to measure a state of a facility. The control apparatus may comprise a learning processing unit configured to generate a control model by learning, the control model being configured to calculate control data for controlling the facility according to the acquired state data. The control apparatus may comprise a model transmission unit configured to transmit the generated control model to a controller configured to control the facility and to cause the controller to set the control model.

The control apparatus may comprise a calculation unit configured to calculate the control data according to the state data, which is a processing target, by using the generated control model. The control apparatus may comprise a control data transmission unit configured to transmit the calculated control data to the controller.

The learning processing unit may be configured to generate the control model that is new by learning, in response to detection of change in external environment.

The learning processing unit may be configured to generate a plurality of the control models having different characteristics including at least one of a certainty of control, a calculation amount or a learning date and time. The model transmission unit may be configured to transmit the plurality of generated control models to the controller and to cause the control models to be set selectable in the controller.

A second aspect of the present invention provides a controller. The controller may comprise a state receiving unit configured to receive state data from at least one sensor configured to measure a state of a facility. The controller may comprise a state transmission unit configured to transmit the state data, which is a learning target, to a control apparatus configured to generate a control model by learning, the control model being configured to calculate control data for controlling the facility according to the state data. The controller may comprise a model receiving unit configured to receive the learned control model from the control apparatus. The controller may comprise a calculation unit configured to calculate the control data corresponding to the state data, which is a processing target, by using the received control model. The controller may comprise a control unit configured to control the facility by using the calculated control data.

The controller may comprise a control data receiving unit configured to receive, from the control apparatus, the first control data calculated using the control model by the control apparatus. The controller may comprise a control data selection unit configured to select the control data that is used for control on the facility, from the first control data and the second control data calculated by the calculation unit.

The control data selection unit may be configured to select the second control data, in response to the control data selection unit being unable to receive the first control data from the control apparatus.

The control data selection unit may be configured to select control data calculated using the control model that is more recent, from the first control data and the second control data.

The model receiving unit may be configured to receive a plurality of the control models having different characteristics including at least one of a certainty of control, a calculation amount or a learning date and time. The calculation unit may be configured to select a control model that is used for control on the facility based on the characteristics, from the plurality of control models.

A third aspect of the present invention provides a control system. The control system may comprise a control apparatus. The control apparatus may include a learning processing unit configured to generate a control model by learning, the control model being configured to calculate control data for controlling a facility according to state data detected by at least one sensor configured to measure a state of the facility. The control apparatus may include a model transmission unit configured to transmit the generated control model to a controller configured to control the facility. The control system may comprise a controller. The controller may include a model receiving unit configured to receive the learned control model from the control apparatus. The controller may include a state receiving unit configured to receive state data from at least one sensor. The controller may include a calculation unit configured to calculate control data for controlling the facility according to the state data, which is a processing target, by using the control model received by the model receiving unit. The controller may include a control unit configured to control the facility by using the calculated control data.

The controller may further include a state transmission unit configured to transmit the state data, which is a learning target, to the control apparatus. The control apparatus may further include a state acquisition unit configured to acquire the state data that is transmitted by the state transmission unit and is a learning target. The learning processing unit may be configured to generate the control model by using the acquired state data.

A fourth aspect of the present invention provides a control method. The control method may comprise acquiring, by a control apparatus, state data detected by at least one sensor configured to measure a state of a facility. The control method may comprise generating, by the control apparatus, a control model by learning, the control model being configured to calculate control data for controlling the facility according to the acquired state data. The control method may comprise transmitting, by the control apparatus, the generated control model to a controller configured to control the facility and causing the controller to set the control model.

A fifth aspect of the present invention provides a computer-readable medium having recorded thereon a control program that is executed by a computer. The control program may be configured to cause the computer to function as a state acquisition unit configured to acquire state data detected by at least one sensor configured to measure a state of a facility. The control program may be configured to cause the computer to function as a learning processing unit configured to generate a control model by learning, the control model being configured to calculate control data for controlling the facility according to the acquired state data. The control program may be configured to cause the computer to function as a model transmission unit configured to transmit the generated control model to a controller configured to control the facility and to cause the controller to set the control model.

A sixth aspect of the present invention provides a control method. The control method may comprise receiving, by a controller, state data from at least one sensor configured to measure a state of a facility. The control method may comprise transmitting, by the controller, the state data, which is a learning target, to a control apparatus configured to generate a control model by learning, the control model being configured to calculate control data for controlling the facility according to the state data. The control method may comprise receiving, by the controller, the learned control model from the control apparatus. The control method may comprise calculating, by the controller, the control data corresponding to the state data, which is a processing target, by using the received control model. The control method may comprise controlling, by the controller, the facility by using the calculated control data.

A seventh aspect of the present invention provides a computer-readable medium having recorded thereon a control program that is executed by a computer. The control program may be configured to cause the computer to function as a state receiving unit configured to receive state data from at least one sensor configured to measure a state of a facility. The control program may be configured to cause the computer to function as a state transmission unit configured to transmit the state data, which is a learning target, to a control apparatus configured to generate a control model by learning, the control model being configured to calculate control data for controlling the facility according to the state data. The control program may be configured to cause the computer to function as a model receiving unit configured to receive the learned control model from the control apparatus. The control program may be configured to cause the computer to function as a calculation unit configured to calculate the control data corresponding to the state data, which is a processing target, by using the received control model. The control program may be configured to cause the computer to function as a control unit configured to control the facility by using the calculated control data.

The summary clause does not necessarily describe all necessary features of the embodiments of the present invention. The present invention may also be a sub-combination of the features described above.

BRIEF DESCRIPTION OF THE DRAWINGS

FIG. 5 shows an example of a control model list according to the present embodiment.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
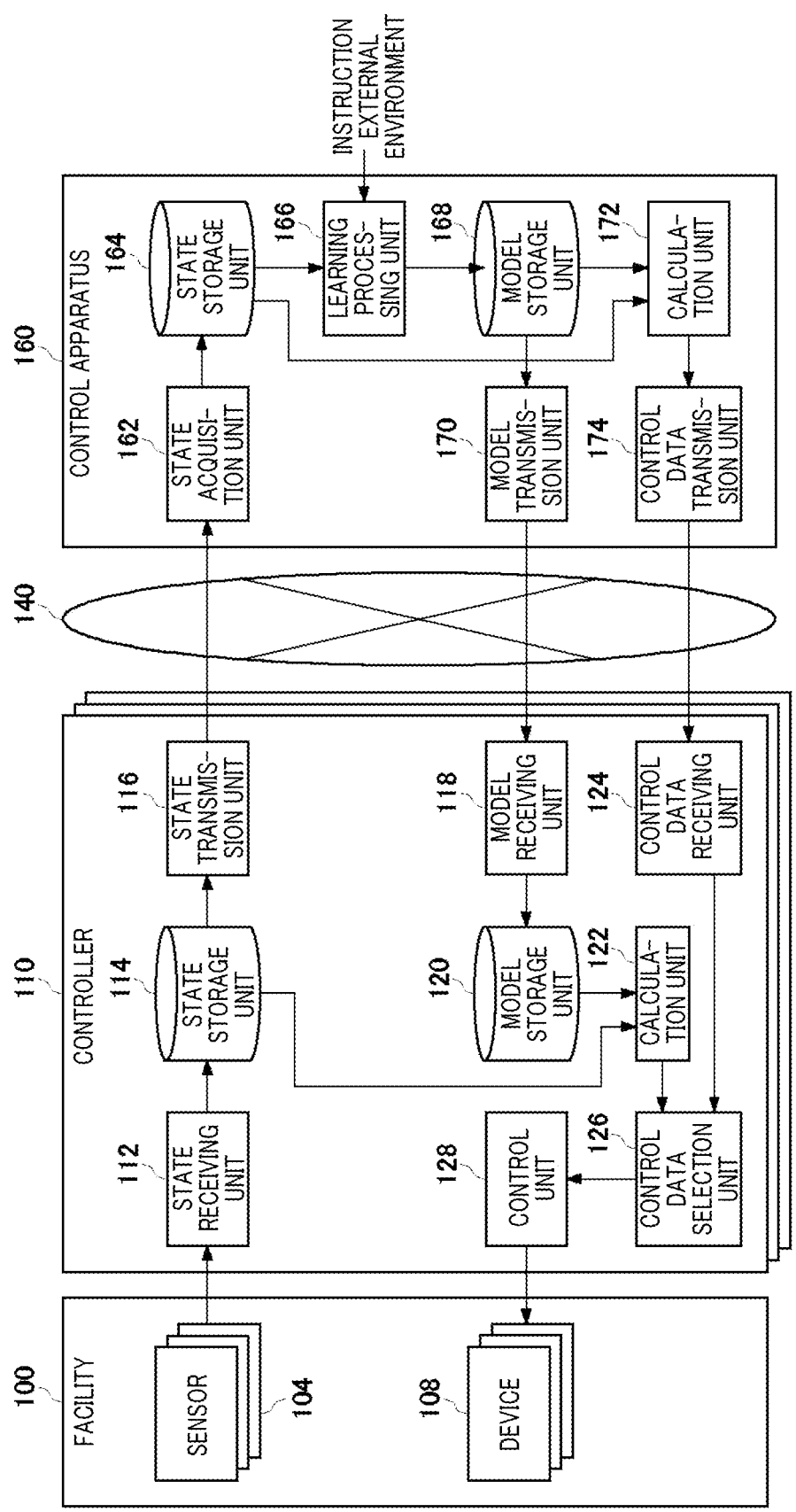
FIG. 1 shows a configuration of a control system 10 according to the present embodiment, together with a facility 100.

FIG. 1 shows a configuration of a control system 10 according to the present embodiment, together with a facility 100. The control system 10 of the present embodiment is configured to control each device 108 in the facility 100 by so-called edge computing by using one or more controllers 110 arranged in the vicinity of the facility 100. On the other hand, the control system 10 is configured to generate a control model, which is used for each controller 110 to control the facility 100, by learning in an upper control apparatus 160. Thereby, the control system 10 can implement learning processing, which is difficult to be performed in each controller 110 and uses a large amount of learning data to require a large calculation amount, by using the upper control apparatus 160 having more processing resources.

The facility 100 is provided at a factory, a plant or the like. Such factory or plant includes, for example, a factory for producing various industrial products and the like, an industrial plant for chemicals, metals or the like, a plant for managing and controlling wellheads such as a gas field and an oilfield and surroundings thereof, a plant for managing and controlling electric generation of hydraulic power, thermal power, nuclear power, and the like, a plant for managing and controlling energy harvesting from solar power, wind power and the like, a plant for managing and controlling water and sewerage, a dam and the like, and the like. In addition, the facility 100 may be provided at a building, a transport facility, or the like.

The facility 100 includes one or more sensors 104 for measuring a state of the facility 100, and one or more devices 108 that are control targets by the facility 100. Each sensor 104 is provided at each place in the facility 100 and is configured to measure a state of the facility 100 at the place. Each sensor 104 may be additionally provided to the device 108 or may be embedded in the device 108. Each sensor 104 may also be a field device having a function of measuring a state. Examples of such field device include a sensor device such as a pressure gauge, a flow meter and a temperature sensor, an imaging device such as a camera or a video configured to capture situations of a plant and the like and an object, an acoustic device such a microphone or a speaker configured to collect abnormal noises and the like of a plant and the like or to generate an alarm sound and the like, a position detection device configured to output position information of an apparatus of the facility 100, and other devices.

Each device 108 is provided at each place in the facility 100 and is controlled by the control system 10. Each device 108 may be a process apparatus, a power generation apparatus or any other apparatus or a part of such apparatus. Each device 108 may also be a field device configured to operate under control from an outside. Examples of such field device may include a valve device such as a flow rate control valve and an opening/closing valve, an actuator device such as a fan and a motor, or other devices.

The control system 10 has a configuration where one or more controllers 110 and the control apparatus 160 are connected via a network 140. Each controller 110 is installed in the vicinity of the facility 100, for example, in the vicinity of the device 108 that is a control target of the controller 110. Each controller 110 is connected to at least some of one or more sensors 104 provided in the facility 100, and is configured to control the device 108, which is a control target, according to state data received from each sensor 104. Each of the plurality of controllers 110 may be connected to each of some of the plurality of sensors 104 of the facility 100 and may be responsible for control on each of some of the plurality of sensors 108 of the facility 100. In this case, each controller 110 is connected to at least one sensor 104 that is highly relevant to the control on the device 108 that is a control target.

The controller 110 is an edge apparatus that is implemented by dedicated hardware or a dedicated computer having a communication function with each sensor 104 of a connection destination, each device 108 of a control target and the control apparatus 160, and a control function on the device 108 of a control target, and the like. Instead of this, the controller 110 may also be implemented by a computer such as a PC (personal computer). In a case where the controller 110 is implemented by a computer, the controller 110 is configured to execute a control program for the controller 110 in the computer, thereby providing various functions of the controller 110.

The controller 110 comprises a state receiving unit 112, a state storage unit 114, a state transmission unit 116, a model receiving unit 118, a model storage unit 120, a calculation unit 122, a control data receiving unit 124, a control data selection unit 126, and a control unit 128. The state receiving unit 112 is connected to at least one sensor 104, which is a monitoring target of the controller 110, and is configured to receive state data from the at least one sensor 104. Here, some of the sensors 104 may be configured to acquire a control parameter of the device 108 from the device 108, and the state receiving unit 112 may be configured to receive a current control parameter set in the device 108 from the sensor 104.

The state storage unit 114 is connected to the state receiving unit 112. The state storage unit 114 may be implemented by a storage apparatus such as a memory, an SSD (solid state drive), or a hard disk, and is configured to sequentially store the state data sequentially received from each of the sensors 104 connected to the controller 110. The state transmission unit 116 is connected to the state storage unit 114. The state transmission unit 116 is configured to transmit state data, which is a learning target, among the state data stored in the state storage unit 114 to the control apparatus 160 via the network 140. Thereby, the control apparatus 160 can generate a control model by learning with respect to the controller 110, the control model being configured to calculate control data for controlling the device 108 of a control target in the facility 100 according to the state data. Note that, the state transmission unit 116 may be configured to transmit even the state data, which is not a learning target, to the control apparatus 160 or to transmit all the state data to the control apparatus 160. In the present embodiment, the state transmission unit 116 is configured to transmit the state data of a processing target to the control apparatus 160 for causing even the control apparatus 160-side to calculate the control data for controlling each device 108.

The model receiving unit 118 is connected to the control apparatus 160 via the network 140. The model receiving unit 118 is configured to receive the learned control model from the control apparatus 160 via the network 140. The model storage unit 120 is connected to the model receiving unit 118. The model storage unit 120 may be implemented by a storage apparatus such as a memory, an SSD, or a hard disk, and is configured to store the received control model.

The calculation unit 122 is connected to the state storage unit 114 and the model storage unit 120. The calculation unit 122 is configured to receive the control model from the model storage unit 120, and to receive the state data, which is a processing target by the control model, from the state storage unit 114. The calculation unit 122 is configured to calculate control data corresponding to the state data, which is a processing target, by using the control model. The 'control data' may be data that prescribes a control condition for the device 108 and the like, which is a control target, and is also described as 'control condition data'. Here, the control model may be prepared for each device 108. In this case, the calculation unit 122 is configured to calculate control data for each device 108 by using the control model associated with each device 108 connected to the controller 110, for each control cycle. In addition, the control model may be prepared for each control parameter of each device 108. In this case, the calculation unit 122 is configured to calculate control data for each control parameter of each device 108 by using the control model associated with each control parameter of each device 108 connected to the controller 110, for each control cycle. In this case, the calculation unit 122 is configured to execute processing relating to two or more control models for each control cycle. Note that, an example of the control model will be described later with reference to FIG. 4.

The control data receiving unit 124 is connected to the control apparatus 160 via the network 140. The control data receiving unit 124 is configured to receive control data calculated using the control model by the control apparatus 160. Here, the control data calculated using the control model by the control apparatus 160 is referred to as 'first control data' and the control data calculated using the control model by the calculation unit 122 is referred to as 'second control data'.

The control data selection unit 126 is connected to the calculation unit 122 and the control data receiving unit 124.

The control data selection unit 126 is configured to select control data, which is used for control on the device 108 of a control target in the facility 100, from the control data (first control data) calculated by the control apparatus 160 and the control data (second control data) calculated by the calculation unit 122. Note that, the selection method will be described later with reference to FIG. 3.

The control unit 128 is connected to the control data selection unit 126. The control unit 128 is configured to control the device 108 of a control target in the facility 100 by using the control data calculated by the calculation unit 122 or the control apparatus 160 and selected by the control data selection unit 126. Note that, the control unit 128 may be configured to use the control data calculated by the calculation unit 122 without using the control data selected by the selection unit 126. Here, the control data may include, for example, a control command that instructs increasing or decreasing the control parameter such as a degree of opening of a valve by a designated magnitude of +10% or the like. In addition, the control data may include a control command that instructs setting a specific value for the control parameter. Further, the control data may include, for example, a control command that instructs turning on or off a device such as a heater or a cooler. In this way, the control data may include any type of the control value or control command for designating or changing an operation of the device 108 of a control target.

The network 140 is configured to connect the controller 110 and the control apparatus 160. The network 140 may be the Internet or a wide area network such as WAN. The network 140 may be, for example, a wireless network including a mobile communication network and the like such as 4G (4th generation) or 5G (5th generation) or may be instead a wired network including the wired Internet and the like.

The control apparatus 160 is connected to the controller 110 via the network 140. The control apparatus 160 may be a computer such as a PC (personal computer), a workstation, a server computer, or a general-purpose computer, or a computer system where a plurality of computers is connected. Such computer system is also a computer in a broad sense. The control apparatus 160 may also be implemented by a virtual computer environment that can be executed one or more times in the computer. Instead of this, the control apparatus 160 may be a dedicated computer designed for controlling the facility 100 or may be dedicated hardware implemented by dedicated circuitry.

Further, the control apparatus 160 may be a cloud computing system that is connected to each controller 110 via the network 140 such as the Internet and is configured to provide cloud service for controlling each device 108 in the facility 100. In a case where the control apparatus 160 is implemented by a computer, the control apparatus 160 is configured to execute a control program for the control apparatus 160 in the computer, thereby providing various functions of the control apparatus 160.

The control apparatus 160 comprises a state acquisition unit 162, a state storage unit 164, a learning processing unit 166, a model storage unit 168, a model transmission unit 170, a calculation unit 172, and a control data transmission unit 174. The state acquisition unit 162 is connected to one or more controllers 110 via the network 140. The state acquisition unit 162 is configured to acquire the state data detected by at least one sensor 104 configured to measure the state of each facility 100. The state acquisition unit 162 of the present embodiment is configured to acquire the state data from each sensor 104 by receiving the state data transmitted by each controller 110 via the network 140. The state acquisition unit 162 may be configured to acquire the state data detected by each sensor 104, indirectly as well as directly. For example, in a case where the state data from each sensor 104 is once stored as history data in the storage apparatus, the state acquisition unit 162 may be configured to acquire state data detected in the past by each sensor 104 from the history data stored in the storage apparatus. In addition, the state acquisition unit 162 may be configured to acquire state data that is not the state data from the controller 110. For example, the state acquisition unit 162 may be configured to acquire virtual state data that is obtained by causing the facility 100 to be virtually executed in a simulation environment. In addition, the state acquisition unit 162 may be configured to acquire state data acquired from a test facility different from the facility 100. In this case, the control apparatus 160 may be configured to generate the control model by using the state data acquired in this way. Note that, the state acquisition unit 162 may be configured to acquire the state data from the sensor 104 without intervention of the controller 110.

The state storage unit 164 is connected to the state acquisition unit 162. The state storage unit 164 may be implemented by a storage apparatus such as a memory, an SSD, or a hard disk, and is configured to sequentially store the state data from each sensor 104 sequentially received via each controller 110.

The learning processing unit 166 is connected to the state storage unit 164. The learning processing unit 166 is configured to generate a control model, which is configured to calculate the control data for controlling the facility 100 according to the state data acquired by the state acquisition unit 162, by learning. In the present specification, the description 'generates the control model by learning' includes not only generation of a new control model but also update of the control model by further performing learning processing on an existing control model. The learning processing unit 166 may be configured to generate (or update) the control model all the time, to generate (or update) the control model periodically, to generate (or update) the control model according to an instruction of a user of the control apparatus 160, or to generate (or update) the control model according to an external environment. Note that, the learning processing unit 166 may be configured to generate a control model, which inputs control data calculated in the past as at least a part of the state data, by learning. Thereby, the learning processing unit 166 can generate a control model configured to perform feedback control of changing a value of the control data calculated according to a value of the past control data.

The model storage unit 168 is connected to the learning processing unit 166. The model storage unit 168 may be implemented by a storage apparatus such as a memory, an SSD, or a hard disk, and is configured to store the control model generated by the learning processing unit 166. The model transmission unit 170 is connected to the model storage unit 168. The model transmission unit 170 is configured to transmit the control model generated by the learning processing unit 166 and stored in the model storage unit 168 to the controller 110 connected to the device 108, which is a control target of the control model in the facility 100, and to cause the control model to be set usable in the controller 110.

The calculation unit 172 is connected to the state storage unit 164 and the model storage unit 168. The calculation unit 172 is configured to receive the control model from the model storage unit 168, and to receive the state data, which is a processing target by the control model, from the state storage unit 164. The calculation unit 172 is configured to calculate control data corresponding to the state data, which is a processing target, by using the control model. Here, the control model may be prepared for each controller 110. In this case, the calculation unit 172 is configured to calculate entire control data, which is used by each controller 110, by using the control model associated with each controller 110, for each control cycle. In a case where the control model is prepared for each device 108, the calculation unit 172 is configured to calculate control data for each device 108 by using the control model associated with each device 108, for each control cycle. In addition, in a case where the control model is prepared for each control parameter of each device 108, the calculation unit 172 is configured to calculate control data for each control parameter of each device 108 by using the control model associated with each control parameter of each device 108 connected to each controller 110, for each control cycle.

The control data transmission unit 174 is connected to the calculation unit 172. The control data transmission unit 174 is configured to transmit the control data calculated by the calculation unit 172 to the controller 110 connected to the device 108 that is a control target by the control data.

According to the control system 10 as described above, the facility 100 is controlled by the edge computing by each controller 110, and the control model that is used for each controller 110 to control the facility 100 can be learned by the upper control apparatus 160. Thereby, the control system 10 can reduce a processing load for the learning processing in each controller 110, and can perform the learning processing by using the upper control apparatus 160 having more processing resources.

In addition, the controller 110 can select the desired control data from the control data calculated by the control apparatus 160 and the control data calculated by the calculation unit 122 and control the device 108 of a control target. Thereby, when the control data calculated by the control apparatus 160 is more favorable, the controller 110 can use the control data calculated by the control apparatus 160, instead of the control data calculated in the controller 110. Note that, the control apparatus 160 may not have the function of calculating the control data. In this case, the control apparatus 160 may not comprise the calculation unit 172 and the control data transmission unit 174, and the controller 110 may not comprise the control data receiving unit 124 and the control data selection unit 126.

Figure 2:
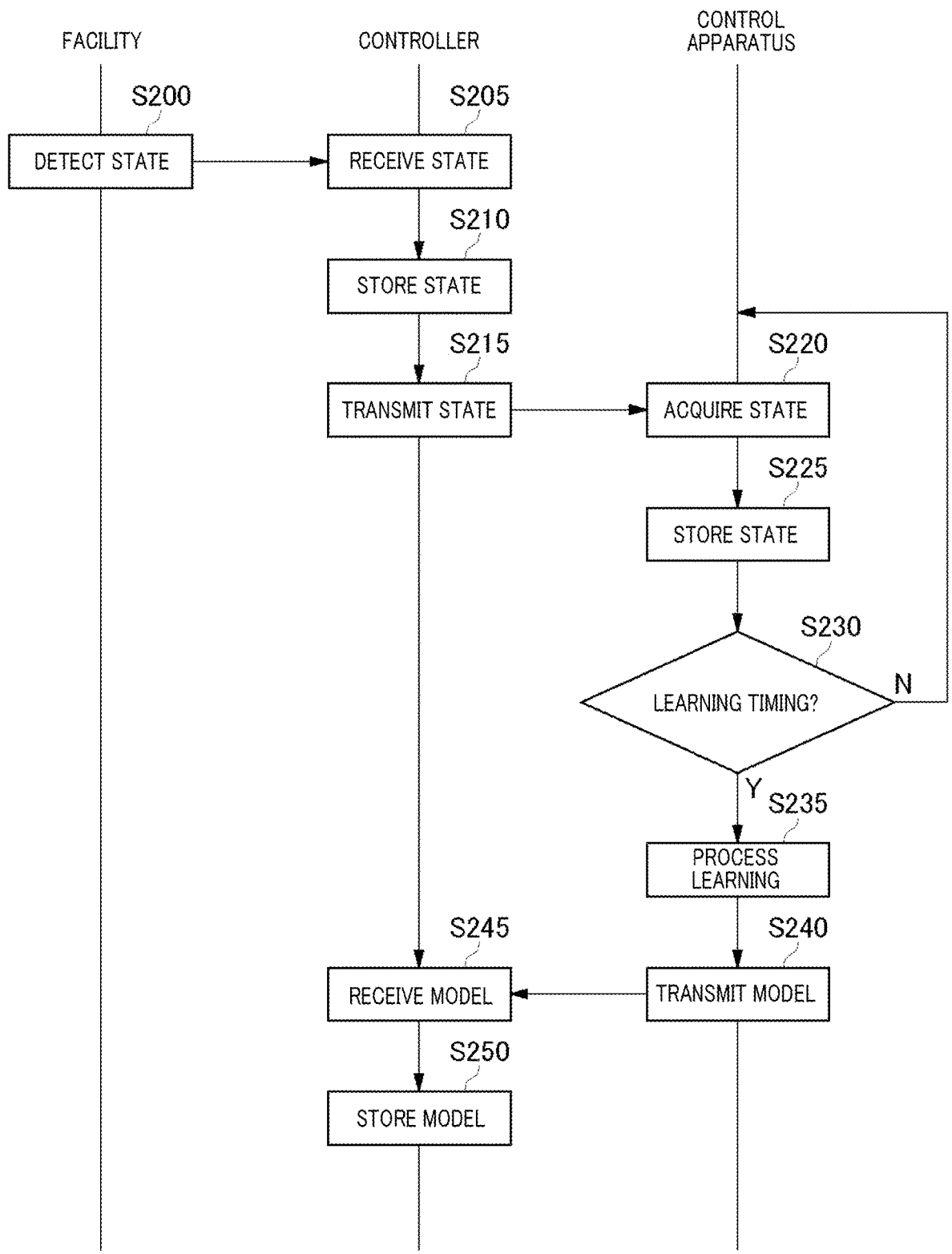
FIG. 2 shows a learning processing flow of the control system 10 according to the present embodiment.

FIG. 2 shows a learning processing flow of the control system 10 according to the present embodiment. In the example of the present figure, for convenience of description, the learning processing flow relating to one controller 110 is mainly shown. However, the present learning processing flow may also be executed with respect to each of the plurality of controllers 110.

In S200 (Step 200), each of the plurality of sensors 104 in the facility 100 detects the state of the facility 100 or the device 108, which is a detection target in the facility 100. Each sensor 104 transmits a detection value of the state to the state receiving unit 112 of a connection destination, as the state data.

In S205, the state receiving unit 112 of the controller 110 receives the detection values of one or more sensors 104, which are monitoring targets, connected to the controller 110, as the state data. Here, the state receiving unit 112 may receive the state data of each sensor 104 every predetermined control cycle or sense cycle.

In S210, the state storage unit 114 sequentially stores the state data received by the state receiving unit 112. Here, the state storage unit 114 may has a storage capacity enough to function as a buffer that temporarily stores the state data until the state data is transmitted to the control apparatus 160 and the state data is used for calculation of the control data. In this case, the state storage unit 114 may have a storage capacity capable of continuously accumulating untransmitted state data for a certain time period even when communication via the network 140 is temporarily interrupted.

Thereby, even when communication of the network 140 is poor, the controller 110 can reduce a possibility of loss of the state data, and the control apparatus 160 can perform learning processing by using continuous state data without loss. Note that, the state storage unit 114 may delete state data, which has been already used or is not used in any of the state transmission unit 116 and the calculation unit 122, or may overwrite the state data with new state data. In S215, the state transmission unit 116 transmits the state data stored in the state storage unit 114 to the control apparatus 160.

In S220, the state acquisition unit 162 of the control apparatus 160 receives the state data from each controller 110 via the network 140. In S225, the state storage unit 164 sequentially stores the state data from each controller 110. Here, the state storage unit 164 at least stores the state data until the state data from each controller 110 is used for learning processing by the learning processing unit 166, for each of the plurality of controllers 110

To this end, the control apparatus 160 may allot a storage capacity larger than that of the state storage unit 114 to each controller 110. In this case, the control apparatus 160 has a storage capacity larger than a sum of the storage capacities of the state storage units 114 of the plurality of controllers 110.

In S230, the learning processing unit 166 determines whether it is time to perform learning processing. When it is not time to perform learning processing, the learning processing unit 166 does not perform learning processing and the control apparatus 160 proceeds to S220 to continuously acquire subsequent state data (N in S230). When it is time to perform learning processing, the control apparatus 160 proceeds to S235 (Y in S230). Here, as simply shown with reference to FIG. 1, the time to perform learning processing may include at least one of followings, as an example.

(1) The learning processing unit 166 performs learning processing all the time. The learning processing unit 166 may be configured to perform learning processing all the time to generate or update the control model. In this case, the learning processing unit 166 may be configured to perform learning processing so as to reflect new state data in the control model each time the new state data is acquired from the controller 110 every control cycle or every sense cycle. Instead of this, the learning processing unit 166 may be configured to perform the learning processing all the time to generate or update the control model as frequently as possible even when the learning processing unit 166 cannot perform the learning processing every control cycle or every sense cycle.

(2) The learning processing unit 166 performs learning processing every predetermined learning cycle. The learning processing unit 166 may be configured to perform learning processing for the control model every predetermined learning cycle such as one hour, one day, one week, or one month, for example. In this case, the learning processing unit 166 may be configured to sequentially generate or update each control model within the learning cycle, so as to perform learning processing for each control model of the plurality of controllers 110 within the learning cycle (3) The learning processing unit 166 performs learning processing, in response to an instruction from an outside. The learning processing unit 166 may be configured to perform learning processing for the control model, in response to an instruction to activate the learning processing being input to the control apparatus 160 from a user of the control system 10 (for example, a surveillant of the facility 100). Here, such instruction may include a designation of the control model to be learned, and the learning processing unit 166 may be configured to perform learning processing for the designated control model, in response to the instruction. In a case where the instruction does not include a designation of a specific control model, the learning processing unit 166 may be configured to perform learning processing for all the control models to be used that can be learned.

(4) The learning processing unit 166 performs learning processing, according to an external environment. The learning processing unit 166 may be configured to perform learning processing, according to an external environment. Specifically, the learning processing unit 166 may be configured to generate a new control model by learning, in response to detection of change in external environment. For example, the learning processing unit 166 is configured to perform learning processing for the control model when an index value corresponding to an outside air temperature, a humidity or other external environment changes beyond a predetermined reference range from an index value at the time of the previous learning processing (for example, when the outside air temperature changes by ±1° C. or more). Instead of this, the learning processing unit 166 may be configured to perform learning processing for the control model, in response to the index value corresponding to the external environment changing beyond a boundary of a section among a plurality of sections divided from an available range of the index value (for example, in response to the outside air temperature rising and changing from a range of 20° C. to 25° C. to a range of 25° C. to 30° C.). Thereby, even when the optimal control condition for the facility 100 changes due to the external environment such as an outside air temperature, for example, like a chemical plant, the learning processing unit 166 can generate and use a control model suitable for the external environment.

In addition, the learning processing unit 166 may use the state data from the sensor 104 other than the sensor 104 connected to the controller 110 of a learning target, i.e., the state data from the sensor 104 connected to the controller 110 other than the controller 110 of a learning target, as an example of such external environment. Thereby, even when an operation of the device 108, which is a learning target, is affected by a state of another device 108, the learning processing unit 166 can generate an appropriate control model and make the control model usable, according to the state of another device 108.

In S235, the learning processing unit 166 performs learning processing for the control model by using the state data stored in the state storage unit 164, as learning data. Here, in a case when the target controller 110 is connected to the two or more devices 108, the learning processing unit 166 may be configured to generate the control model for each of the devices 108. In addition, in a case where the control models different for each of one or two or more control parameters of the device 108 are used, the learning processing unit 166 may be configured to generate the control model for each of one or two or more control parameters. The model storage unit 168 stores the generated control model in the model storage unit 168. In S240, the model transmission unit 170 transmits each control model stored in the model storage unit 168 to the controller 110 that uses the control model, and causes the controller 110 to set the control model.

In S245, the model receiving unit 118 receives the learned control model transmitted by the control apparatus 160. In S250, the model receiving unit 118 stores the received control model in the model storage unit 120. Thereby, the model receiving unit 118 sets the control model from the control apparatus 160 so that the controller 110 can use the control model.

As described above, the control apparatus 160 can cause the upper control apparatus 160 to learn the control model that is used for each controller 110 to control the facility 100. Thereby, since each controller 110 does not have to perform learning processing for the control model by itself, it is possible to allot the processing resources enough to control the facility 100.

Figure 3:
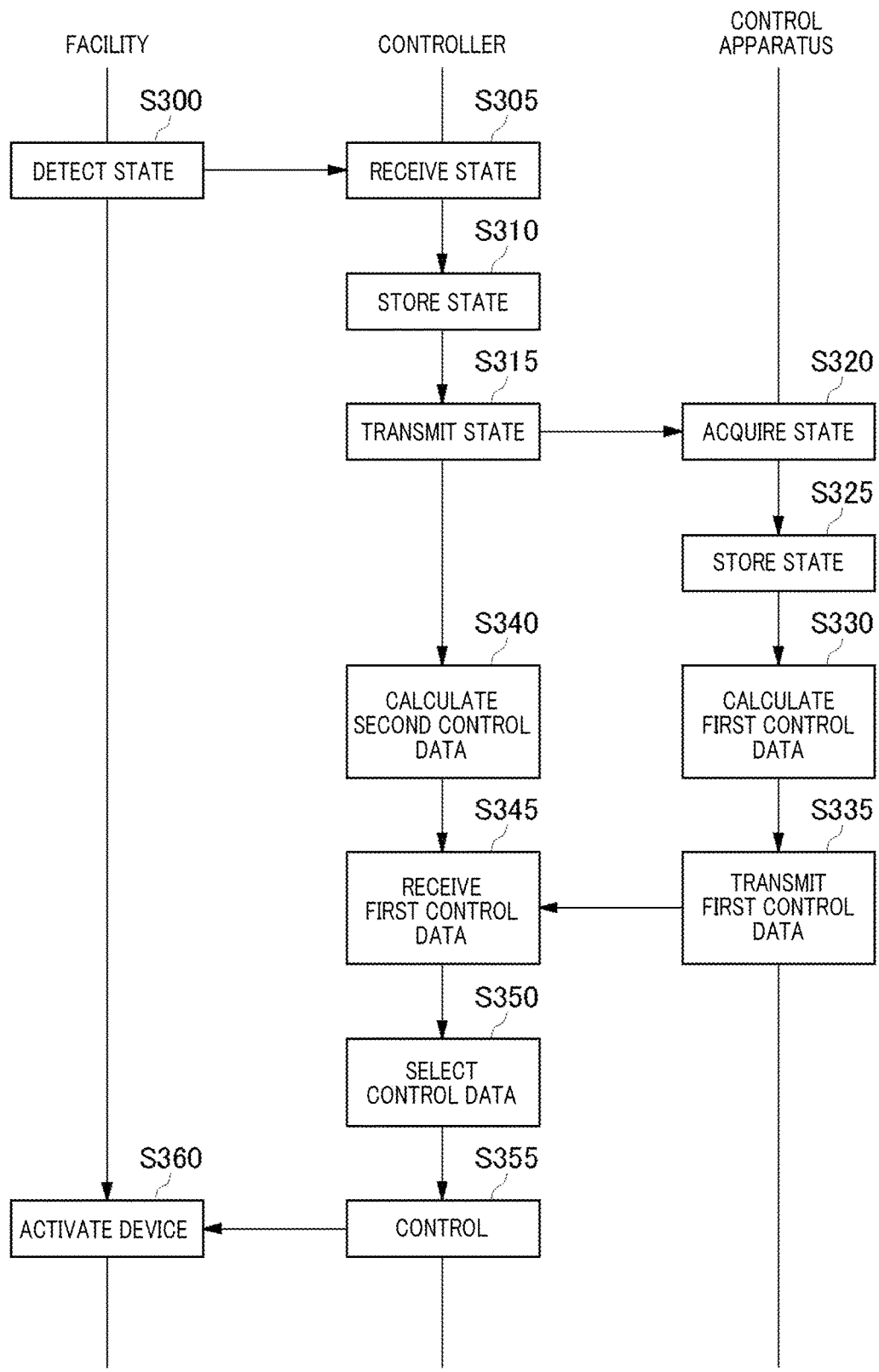
FIG. 3 shows a device control flow of the control system 10 according to the present embodiment.

FIG. 3 shows a device control flow of the control system 10 according to the present embodiment. In the example of the present figure, for convenience of description, the device control flow relating to one controller 110 is mainly shown. However, the present device control flow may also be executed for each of the plurality of controllers 110.

Since S300, S305, S310, S315, S320, and S325 are similar to S200, S205, S210, S215, S220, and S225 of FIG. 2, the descriptions thereof are omitted. In S330, the calculation unit 172 in the control apparatus 160 reads out the state data, which is a processing target by the controller 110, from the state storage unit 164 and calculates the control data (first control data) by using the control model stored in the model storage unit 168, every control cycle. Here, in a case where the control model is used for each device 108 or for each of at least one control parameter of each device 108 with respect to the controller 110, the calculation unit 172 calculates a set of a plurality of control data by using each of the plurality of control models. In S335, the control data transmission unit 174 transmits the control data calculated by the calculation unit 172 to the controller 110.

In S340, the calculation unit 122 in the controller 110 reads out the state data, which is a processing target, from the state storage unit 114 and calculates the control data (second control data) by using the control model stored in the model storage unit 120, every control cycle. Here, in a case where the control model is used for each device 108 or for each of at least one control parameter of each device 108, the calculation unit 122 calculates a set of a plurality of control data by using each of the plurality of control models.

In S350, the control data selection unit 126 selects the control data, which is used for control on the facility 100, from the first control data calculated by the control apparatus 160 and the second control data calculated by the calculation unit 122, for each device 108 or for each of at least one control parameter of each device 108. In S355, the control unit 128 controls the device 108 by using the selected control data, for each device 108 or for each of at least one control parameter of each device 108. In S360, the device 108 that is a control target is activated in response to a control command, under control of the control unit 128.

As described above, in S350, the control data selection unit 126 selects the control data, which is used for control on the facility 100, from the first control data and the second control data. The selection method may be any one of following methods or a combination thereof.

(1) The control where the control apparatus 160-side is a main system and the controller 110-side is an auxiliary system is performed. For each control cycle, in a case where the control data selection unit 126 acquires the first control data and the second control data for a certain control target (the device 108 or the control parameter of the device 108), the control data selection unit 126 may be configured to preferentially select the first control data from the control apparatus 160. In this method, the control data selection unit 126 is configured to acquire the second control data by the controller 110, as preliminary control data. For example, in a case where communication delay or communication failure occurs in communication with the control apparatus 160, the control data selection unit 126 may be configured to select the second control data by the controller 110 and provide the same for control, in response to the control data selection unit 126 being unable to receive the first control data from the control apparatus 160 within a necessary control cycle.

The control model that is used by the control apparatus 160 and the control model that is used by the controller 110 may be the same. Instead of this, the control apparatus 160 may be configured to use the newly learned control model that has not been yet transmitted to the controller 110. In this case, the controller 110 can control the facility 100 by using the latest control model not received at normal times and can control the facility 100 by using the control model already received even when communication delay or the like has occurred.

In addition, the control model that is used by the control apparatus 160 may be a control model that has a higher processing load such as a calculation amount or a memory usage than the control model that is used by the controller 110, but can calculate more appropriate control data. Further, while the control model that is used by the controller 110 is a control model configured to calculate the control data without using the state data and the like from the sensor 104 not connected to the controller 110, the control model that is used by the control apparatus 160 may be configured to calculate the control data by further using the state data from the sensor 104 other than the sensor 104 connected to the target controller 110 or data such as data of the external environment that is not used by the control model of the controller 110. In a case of using such method, the controller 110 can appropriately control the facility 100 by using the first control data from the control apparatus 160 that can enable more certain control, in a usual state, and can keep the control on the facility 100 by using the second control data by the controller 110 when the first control data cannot be received in a timely way.

(2) The control where the controller 110-side is a main system and the control apparatus 160-side is an auxiliary system is performed. For each control cycle, in a case where the control data selection unit 126 acquires the first control data and the second control data for a certain control target, the control data selection unit 126 may be configured to preferentially select the second control data by the controller 110. In this method, the control data selection unit 126 is configured to acquire the first control data by the control apparatus 160, as preliminary control data. For example, the control data selection unit 126 is configured to select the second control data by the controller 110 in a usual state. However, when an abnormality occurs in the calculation unit 122, when the second control data calculation is delayed or the second control data cannot be calculated due to deficiency in resources in the controller 110, when the calculation unit 122 cannot be temporarily used for maintenance of the controller 110 or for setting of a new control model, or when the second control data cannot be used due to other factors, the control data selection unit 126 can use the first control data from the control apparatus 160. Also in this case, the relationship between the control model that is used by the controller 110 and the control model that is used by the control apparatus 160 may be similar to (1).

(3) The control where the control data is dynamically selected is performed. The control data selection unit 126 may be configured to dynamically select or switch whether to use the first control data from the control apparatus 160 or the second control data by the controller 110, every control cycle or every predetermined time period. As an example, characteristic information including at least one of a certainty (prediction accuracy or the like) of the control model used for calculation of the control data or a learning date and time is added to the first control data and the second control data. The control data selection unit 126 may be configured to use the characteristic information to select whether to use the first control data or the second control data.

For example, the control data selection unit 126 may be configured to preferentially select control data whose certainty in the characteristic information is higher, from the first control data and the second control data. In addition, the control data selection unit 126 may be configured to give priority to the characteristic data, in which the learning date and time in the characteristic information is more recent, of the first control data and the second control data, thereby selecting the control data calculated using a newer control model. In a case where the characteristic information includes data about a plurality of types of characteristics, the control data selection unit 126 may be configured to convert characteristic information of each of the first control data and the second control data into one index value indicative of a priority or the like by weighting or the like, and may be configured to preferentially select the control data whose index value is larger (or smaller). Thereby, the control data selection unit 126 can dynamically switch the control data to be selected, according to the characteristics of the first and second control data received, and can perform control on the facility 100, which is recognized as being more appropriate at each time point.

Note that, in the present embodiment, the controller 110 is configured to calculate the control data by using the control model stored in the model storage unit 120. However, instead of this, the controller 110 may also be configured to calculate the control data by using the latest control model stored in the model storage unit 168. For example, the controller 110 inquires the control apparatus 160 whether the latest control model is stored in the model storage unit 168, every control cycle, and requests the control apparatus 160 to transmit at least a part of the latest control model when the latest control model is stored in the model storage unit 168. The controller 110 temporarily buffers the latest control model received by the model receiving unit 118 in the model storage unit 120, and the control data is calculated using the control model. Thereby, the controller 110 can control the facility 100 by using the latest control model all the time.

Figure 4:
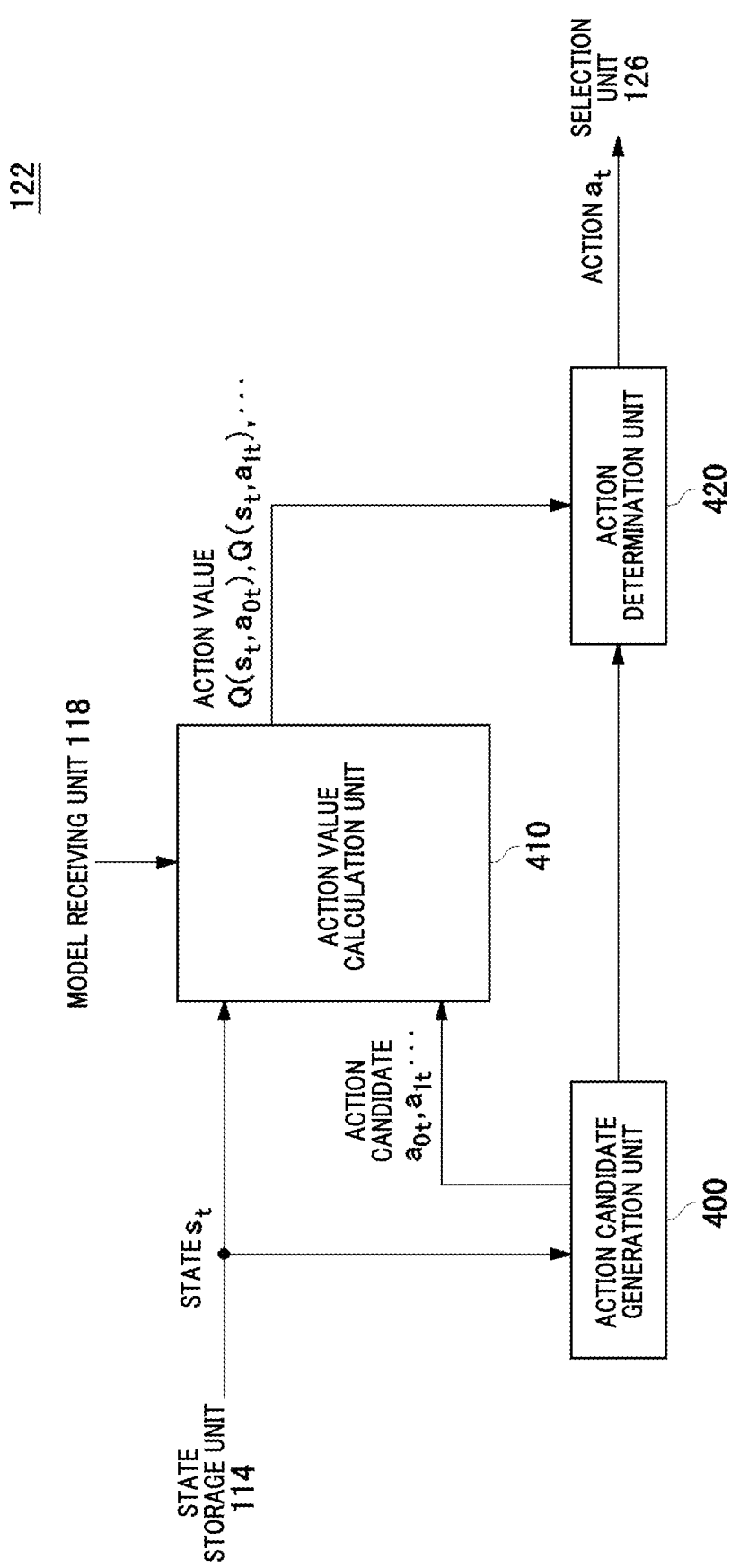
FIG. 4 shows a configuration of a calculation unit 122 according to the present embodiment.

FIG. 4 shows a configuration of the calculation unit 122 according to the present embodiment. The present figure shows a case where the control model is learned by reinforcement learning. The calculation unit 122 includes an action candidate generation unit 400, an action value calculation unit 410, and an action determination unit 420.

The action candidate generation unit 400 is configured to receive state data $s_t$, which is a processing target by the control model, among the state data received from at least one sensor 104 connected to the controller 110 from the state storage unit 114, for a sense cycle corresponding to time t. Here, the state data $s_t$ may include the state data received from all the sensors 104 connected to the controller 110 or may include the state data determined to be used in the control model while excluding the state data determined not to be used in the control model during learning processing.

The action candidate generation unit 400 is configured to generate one or more action candidates $a_{0t}, a_{1t}, \ldots$ that can be adopted for the control cycle during which the facility 100 is controlled, according to the state data $s_t$ at time t. Here, at least one action candidate may be one that can be used irrespective of a value of the state data $s_t$, and in this case, the action candidate generation unit 400 may select such action candidate all the time.

In addition, the other at least one action candidate may be one that is determined as to whether it can be used, depending on the value of the state data $s_t$, and in this case, the action candidate generation unit 400 may determine whether to use such action candidate, according to the value of the state data $s_t$. The action candidate corresponding to the value of such state data $s_t$ may be limited as to a range that the control parameter can take, for example. For example, in a case where a degree of opening of a valve of any device 108 is 95%, the action candidate generation unit 400 may generate an action candidate that increases the degree of opening of the valve by 5%. However, in a case where the degree of opening of the valve is 100%, the action candidate generation unit 400 may not generate an action candidate that further increases the degree of opening of the valve.

In addition, the action candidate corresponding to the value of the state data $s_t$ may be limited as to a rated range of use and the like of the device 108 that is the control target. For example, in a case where a temperature of a raw material that is input to any device 108 is limited to 100 degrees or lower due to a rating of the device 108, when a raw material of 98 degrees is input to the device 108 at time t, the action candidate generation unit 400 may not generate an action candidate that increases the temperature of the raw material input to the device 108 by 5 degrees.

The action value calculation unit 410 is connected to the action candidate generation unit 400. The action value calculation unit 410 is configured to predict, by using the control model, action values $Q(s_t, a_{0t}), Q(s_t, a_{1t}), \ldots$ when executing each of one or more action candidates $a_{0t}, a_{1t}, \ldots$ in a state of the facility 100 at time t according to the state data $s_t$ at time t. The action value $Q(s_t, a_{0t})$ may indicate a reward that is obtained when executing an action of the action candidate $a_{0t}$ and the like in the state of the facility 100 at time t.

Here, the control model is a model in which an action value function Q(s, a) for predicting a value of taking a certain action a in a given state s is learned by the learning processing unit 166 so as to optimize performance of the facility 100 or the device 108 of a control target during a time period of a certain length of a control cycle of several hundred cycles and the like, for example, by using a method of the reinforcement learning such as Monte Carlo method or the TD learning method, as an example. The control apparatus 160 may be configured to determine such performance by a target function such as KPI (Key Performance Index) predetermined as at least one function of a production volume of articles of manufacture in a production plant, a production volume of products by the device 108 of a control target, consumption amounts of raw materials and electric power and the like, or other various parameters, for example. In a certain implementation, the learning processing unit 166 may be configured to generate a neural network, which is learned to input the state s and the action a and to output an expected value Q(s, a) of the action value, by learning and to provide the neural network to the action value calculation unit 410.

The action determination unit 420 is connected to the action candidate generation unit 400 and the action value calculation unit 410. The action determination unit 420 is configured to determine, from one or more action candidates $a_{0t}, a_{1t}, \ldots$ generated by the action candidate generation unit 400, an action $a_t$ to be taken for the control cycle corresponding to time t, based on the action values $Q(s_t, a_{0t}), Q(s_t, a_{1t}), \ldots$ of the action candidates calculated by the action value calculation unit 410, and to supply the control data corresponding to the action $a_t$ to the control data selection unit 126. The action determination unit 420 is configured to select the action $a_t$ that can maximize the action value, in principle. In order to increase types of the actions that can be selected in future, the action determination unit 420 may be configured to select an action candidate that is not always optimal, such as a next best action candidate or an action candidate having an action value equal to or greater than a predetermined threshold value, with a predetermined probability.

The calculation unit 172 may have a function and a configuration that are similar to the calculation unit 122. Note that, the calculation unit 122 and the calculation unit 172 may also use a control model by a machine learning algorithm different from the one using the reinforcement learning as described above. For example, the calculation unit 122 and the calculation unit 172 may use a control model learned by a kernel dynamic policy programming method disclosed in Patent Document 1. In addition, the calculation unit 122 and the calculation unit 172 may use a control model learned by any other machine learning algorithms including, for example, a neural network, a statistical learning, a random forest, a gradient boosting, a logistic regression, a support vector machine (SVM) or the like.

FIG. 5 shows an example of a control model list according to the present embodiment. The control model list shown in the present figure is stored in the model storage unit 168 of the control apparatus 160. The learning processing unit 166 is configured to add an entry corresponding to a new control model to the control model list, in response to generation of the new control model. The learning processing unit 166 is also configured to update an entry corresponding to an updated control model in the control model list, in response to the update of the control model.

The control model list stores information about each of one or more control models stored in the model storage unit 168. In the example shown in the present figure, the control model list stores, for each control model, an entry including control model identification information (control model ID), identification information (controller ID) of a controller that uses the control model, identification information (control target ID) of a control target of the control model, and a characteristic of the control model.

The 'control model ID' is identification information for specifying a control model, such as an identifier allotted to the control model. The learning processing unit 166 may be configured to allot different control model IDs to all control models to be generated or may be configured to allot different control model IDs to all control models to be generated in a plurality of control systems 10.

The 'controller ID' is identification information for specifying the controller 110 that uses the control model. In the example of the present figure, the control models having control model IDs 1 and 2 are all used in the controller 110 having a controller ID C1.

The 'control target ID' is identification information for specifying a control target of the control model. In a case where the control model controls a certain device 108, the control target ID is identification information for specifying the device 108. In addition, in a case where the control model controls a certain control parameter of a certain device 108, the control target ID is identification information for specifying the control parameter. In the example of the present figure, the control models having the control model IDs 1 and 2 are all used in the device 108 having a control target ID 1a.

The 'characteristic' is characteristic information of the control model. In the example of the present figure, the characteristic information of the control model includes a 'certainty' of control, a 'calculation amount' and a 'learning date and time'. The 'certainty' of control is an index indicating how appropriate the control using the control data calculated by the control model is. As an example, the 'certainty' of control may be a certainty (prediction accuracy and the like) obtained by calculating a probability that an action determined by the control model will be an optimal action at the time of learning or ex-post facto or may be an expected value of a reward obtained by the action determined by the control model, i.e., a value obtained by weighting a maximum action value for all states s with an occurrence probability of the state s.

In general, the certainty of control is lower as the control model is simpler, and is higher as the control model is more complex unless over-learning occurs. Here, the description 'control model is complex' may refer to a case where more state data is input, a case where the calculation amount used in the control model is large (for example, at least one of the number of neurons or the number of layers of neurons is large when a neural network is used), and the like. Therefore, the learning processing unit 166 may be configured to determine the certainty of control according to complexity of the control model.

In the example of the present figure, the certainty of control indicates a probability that an action determined by the control model will be an optimal action. In the example of the present figure, the control model having the control model ID 1 has the certainty of 0.9, and the control model having the control model ID 2 has the certainty of 0.8.

The 'calculation amount' is an index indicating how many the processing resource is used when the control data calculating processing using the control model is executed for each control cycle. As an example, the 'calculation amount' may be a (average) computation amount (for example, the number of operations such as addition, subtraction, multiplication and division) of the control model every control cycle, the (average) number of commands that are executed when a processor in the controller 110 executes the control model every control cycle, an occupying time of the controller 110 every control cycle, or the like. In addition, the 'calculation amount' may include usages of resources other than the processor in the controller 110, such as a memory usage in the controller 110.

In the example of the present figure, the 'calculation amount' indicates the computation amount of the control model every control cycle. In the example of the present figure, the control model having the control model ID 1 has the calculation amount of 100, and the control model having the control model ID 2 has the calculation amount of 20.

The 'learning date and time' indicates a date and time at which the control model has been learned. In the example of the present figure, the control model having the control model ID 1 has been learned on Sep. 18, 2020, and the control model having the control model ID 2 has been learned on Sep. 20, 2020. In the present embodiment, the control apparatus 160 performs learning by using the latest state data at the start of learning. Therefore, the 'learning date and time' approximately indicates a date and time at which learning data used for learning of the control model was collected. In a case where the control apparatus 160 performs learning by using the past state data, the 'learning date and time' may indicate a data and time at which the state data used for learning was collected (for example, a date and time at the end of a time period for which the state data used for learning was collected), i.e., a data and time corresponding to a collection time period of the learning data.

In the 'characteristic', various characteristics relating to the control model may be recorded in addition to the above. For example, in the 'characteristic', an external environment (outside air temperature, humidity and the like) at a time when the control model was learned (or at a time when the state data used for learning of the control model was collected) may be recorded.

As shown in the present figure, the learning processing unit 166 may generate a plurality of control models having different characteristics including at least one of the certainty of control, the calculation amount or the learning date and time, for each controller 110 or each control target, in S235 of FIG. 2, for example. For example, in S240 of FIG. 2, the model transmission unit 170 may transmit the plurality of control models generated in this way to the controller 110 and cause the control models to be set selectable in the controller 110.

For example, in S245 of FIG. 2, the model receiving unit 118 of the controller 110 may receive the plurality of control models having such different characteristics. Similar to the model storage unit 168, the model storage unit 120 may be configured to store a control model list including an entry relating to each control model stored by the model receiving unit 118. The calculation unit 122 of the controller 110 may be configured to select a control model, which is used for control on the facility 100, from the plurality of control models, based on the characteristics.

For example, in a case where two or more control models having different resource usages such as a calculation amount, a memory usage and the like for the same control target are stored in the model storage unit 120, the calculation unit 122 may be configured to select a control model to be used, on condition that shortage of the processing resources of the controller 110 does not occur. In other words, the calculation unit 122 selects a control model, on condition that the resource usage of the control model does not exceed the resource amount that can be used for control on the control target in the controller 110.

In addition, in a case where two or more control models having different certainties of control for the same control target are stored in the model storage unit 120, the calculation unit 122 may be configured to preferentially use a control model having a higher certainty of control. Note that, for example, in a case where the controller 110 does not have a processing resource enough to execute a control model having a higher certainty of control, the calculation unit 122 may be configured to select a control model having a lower certainty of control.

In addition, in a case where two or more control models having different learning dates and times for the same control target are stored in the model storage unit 120, the calculation unit 122 may be configured to preferentially use a control model having a more recent learning date and time. Instead of this, the calculation unit 122 may be configured to select a control model according to variation in characteristic of the device 108 that is repeated every day by preferentially using a control model associated with the learning date and time of a time close to a current time of one day, for example, or may select a control model according to yearly variation in characteristic or season of the device 108 by preferentially using a control model associated with the learning date and time of a day close to a current day of one year, for example.

In addition, the control apparatus 160 may be configured to transmit an instruction as to selection of a control model, which is input from a surveillant of the facility 100 or the like, to the controller 110. The calculation unit 122 in the controller 110 may be configured to select which control model is to be used, in response to the instruction. For example, when an instruction to select a control model in which the learning date and time is within a designated time period is received, the calculation unit 122 may select a control model associated with the learning date and time within the designated time period. Thereby, the calculation unit 122 can receive a manual designation and select a control model by which control on the facility 100 was appropriately performed in the past, a control model learned in a situation close to the current external environment or other specific control model, for example.

As described above, the calculation unit 122 can select a plurality of control models according to the characteristics, thereby controlling the device 108 of a control target and the like by using the more appropriate control model. Note that, similar to the calculation unit 122, the calculation unit 172 in the control apparatus 160 may be configured to select a control model that is used by the calculation unit 172 from the plurality of control models for each control target of each controller 110.

Figure 6:
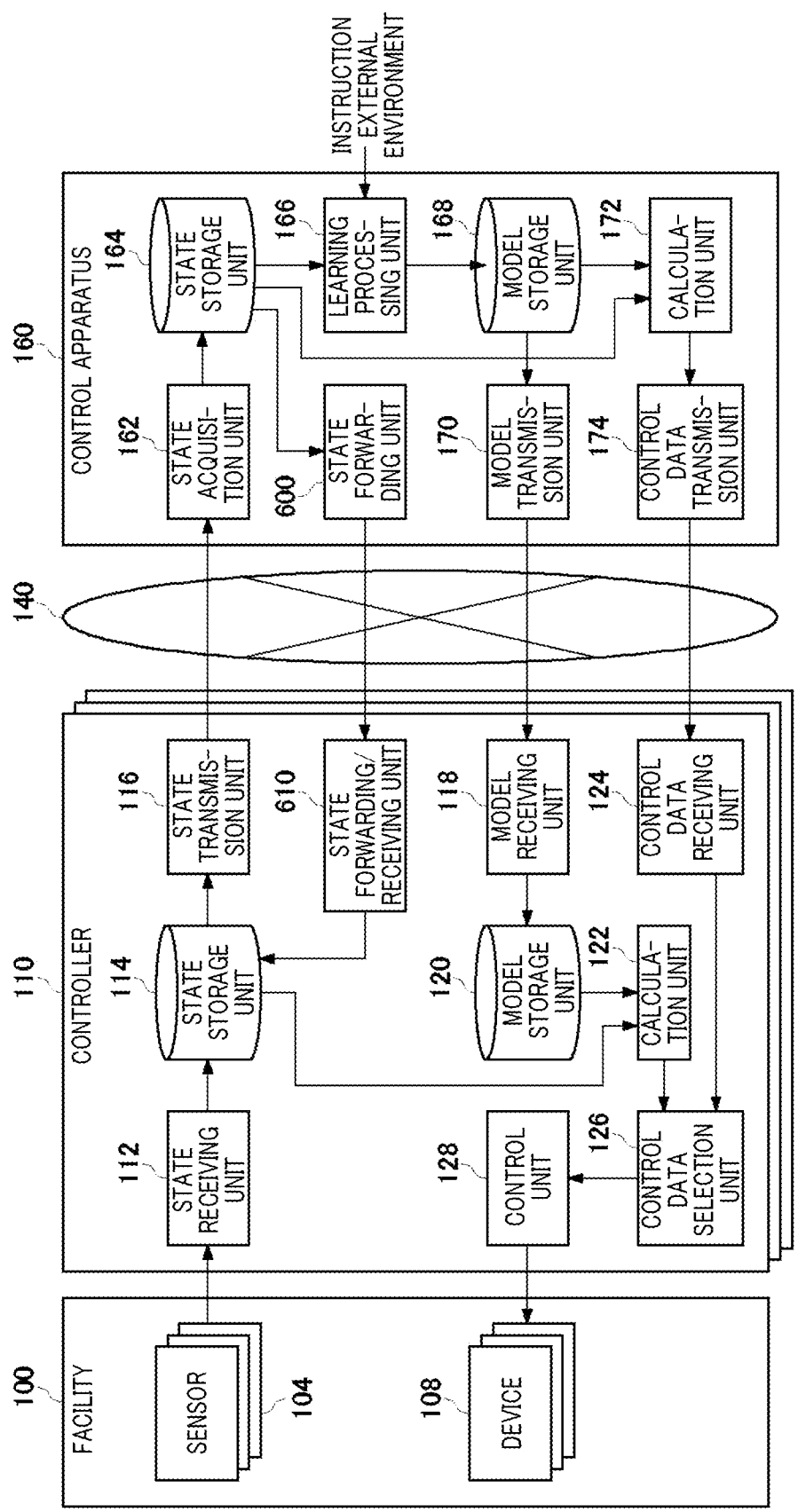
FIG. 6 shows a configuration of the control system 10 according to a modified embodiment of the present embodiment, together with the facility 100.

FIG. 6 shows a configuration of the control system 10 according to a modified embodiment of the present embodiment, together with the facility 100. The control system 10 of the present modified embodiment is a modified embodiment of the control system 10 shown in FIG. 1. In the present figure, the members having the same functions and configurations as those in FIG. 1 are denoted with the same reference signs as FIG. 1, and the descriptions thereof are omitted, except differences. The control system 10 of the present modified embodiment is configured so that the control model used in the controller 110 can calculate the control data by using the state data from the sensor 104 connected to another controller 110. In order to realize this, the control system 10 of the present modified embodiment has a configuration where a state forwarding unit 600 is added to the control apparatus 160 and a state forwarding/receiving unit 610 is added to the controller 110 in the control system 10 shown in FIG. 1.

The state forwarding unit 600 is connected to the state storage unit 164. The state forwarding unit 600 is configured to forward the state data transmitted from the sensor 104 connected to a certain controller 110 and stored in the state storage unit 164 to the control model that inputs the state data and is executed in another controller 110. Here, the state forwarding unit 600 may be configured to acquire forwarding destination information, which indicates which state data should be transmitted to which controller 110, from the learning processing unit 166 configured to generate a control model. Instead of this, the model storage unit 168 may be configured to store the forwarding destination information in the control model list, and the state forwarding unit 600 may be configured to acquire the forwarding destination information from the model storage unit 168.

The state forwarding/receiving unit 610 is connected to the state forwarding unit 600 via the network 140. The state forwarding/receiving unit 610 is configured to receive the state data forwarded by the state forwarding unit 600 and received by another controller 110 and to store the state data in the state storage unit 114. Thereby, the calculation unit 122 can calculate the control data by using the control model that uses the state data received by another controller 110 as an input.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA) and programmable logic arrays (PLA).

Computer-readable media may include any tangible device that can store instructions for execution by a suitable device, such that the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark) and C++, and conventional procedural programming languages, such as the "C" programming language or similar programming languages.

Computer-readable instructions may be provided to a processor or programmable circuitry of a programmable data processing apparatus such as a general purpose computer, special purpose computer, or another computer, locally or via a local area network (LAN), wide area network (WAN) such as the Internet, to execute the computer-readable instructions to create means for performing operations specified in the flowcharts or block diagrams. Examples of processors include computer processors, processing units, microprocessors, digital signal processors, controllers, microcontrollers, etc.

Figure 7:
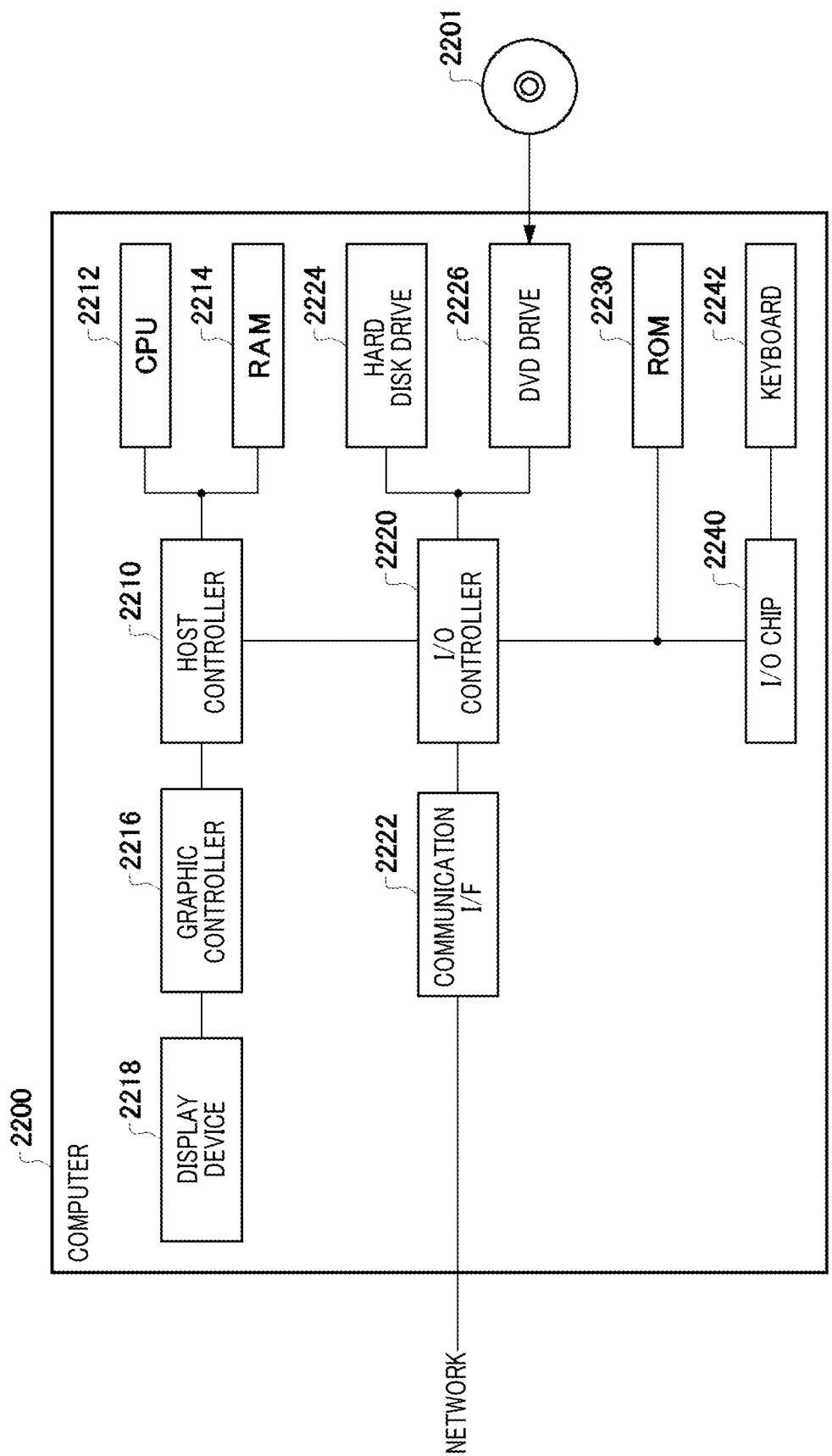
FIG. 7 shows an example of a computer 2200 in which a plurality of aspects of the present invention may be entirely or partially implemented.

FIG. 7 shows an example of a computer 2200 in which a plurality of aspects of the present invention may be entirely or partially implemented. A program that is installed in the computer 2200 can cause the computer 2200 to function as or execute operations associated with the apparatus of the embodiment of the present invention or one or more sections thereof, and/or cause the computer 2200 to execute the process of the embodiment of the present invention or steps thereof. Such program may be executed by a CPU 2212 so as to cause the computer 2200 to execute certain operations associated with some or all of the blocks of flowcharts and block diagrams described herein.

The computer 2200 according to the present embodiment includes a CPU 2212, a RAM 2214, a graphic controller 2216 and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 is configured to operate according to programs stored in the ROM 2230 and the RAM 2214, thereby controlling each unit. The graphic controller 2216 is configured to acquire image data generated by the CPU 2212 on a frame buffer or the like provided in the RAM 2214 or in itself, and to cause the image data to be displayed on the display device 2218.

The communication interface 2222 is configured to communicate with other electronic devices via a network. The hard disk drive 2224 is configured to store programs and data used by the CPU 2212 within the computer 2200. The DVD-ROM drive 2226 is configured to read the programs or the data from the DVD-ROM 2201, and to provide the hard disk drive 2224 with the programs or the data via the RAM 2214. The IC card drive is configured to read programs and data from an IC card, and/or to write programs and data into the IC card.

The ROM 2230 is configured to store therein a boot program or the like that is executed by the computer 2200 at the time of activation, and/or a program depending on the hardware of the computer 2200. The input/output chip 2240 may also be configured to connect various input/output units to the input/output controller 2220 via a parallel port, a serial port, a keyboard port, a mouse port and the like.

A program is provided by a computer-readable medium such as the DVD-ROM 2201 or the IC card. The program is read from the computer-readable medium, is installed into the hard disk drive 2224, the RAM 2214 or the ROM 2230, which are also examples of the computer-readable medium, and is executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffer processing region provided in a recording medium such as the RAM 2214, the hard disk drive 2224, the DVD-ROM 2201, or the IC card, and transmits the read transmission data to a network or writes reception data received from a network to a reception buffer processing region or the like provided on the recording medium.

In addition, the CPU 2212 may be configured to cause all or a necessary portion of a file or a database, which has been stored in an external recording medium such as the hard disk drive 2224, the DVD-ROM drive 2226 (DVD-ROM 2201) and the IC card, to be read into the RAM 2214, thereby executing various types of processing on the data on the RAM 2214. The CPU 2212 is configured to write back the processed data to the external recording medium.

Various types of information, such as various types of programs, data, tables, and databases, may be stored in the recording medium to undergo information processing. The CPU 2212 may also be configured to execute various types of processing on the data read from the RAM 2214, which includes various types of operations, processing of information, condition judging, conditional branching, unconditional branching, search/replacement of information and the like described in the present disclosure and designated by an instruction sequence of programs, and to write the result back to the RAM 2214. The CPU 2212 may also be configured to search for information in a file, a database, etc., in the recording medium. For example, when a plurality of entries, each having an attribute value of a first attribute associated with an attribute value of a second attribute, is stored in the recording medium, the CPU 2212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on or near the computer 2200. In addition, a recording medium such as a hard disk or a RAM provided in a server system connected to a dedicated communication network or the Internet can be used as the computer-readable medium, thereby providing the programs to the computer 2200 via the network.

While the present invention has been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: control system, 100: facility, 104: sensor, 108: device, 110: controller, 112: state receiving unit, 114: state storage unit, 116: state transmission unit, 118: model receiving unit, 120: model storage unit, 122: calculation unit, 124: control data receiving unit, 126: control data selection unit, 128: control unit, 140: network, 160: control apparatus, 162: state acquisition unit, 164: state storage unit, 166: learning processing unit, 168: model storage unit, 170: model transmission unit, 172: calculation unit, 174: control data transmission unit, 400: action candidate generation unit, 410: action value calculation unit, 420: action determination unit, 600: state forwarding unit, 610: state forwarding/receiving unit, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard.

What is claimed is:

1. A controller comprising:
   at least one processor;
   a state receiving unit configured to receive state data detected by at least one sensor configured to measure a state of a facility using the at least one processor;
   a state transmission unit configured to transmit the state data, which is a learning target, to a control apparatus configured to generate a control model by learning, the control model being configured to calculate control data for controlling the facility according to the state data, using the at least one processor;
   a model receiving unit configured to receive the learned control model from the control apparatus using the at least one processor;
   a calculation unit configured to calculate the control data corresponding to the state data, which is a processing target, by using the received control model, using the at least one processor;
   a control unit configured to control the facility by using the calculated control data using the at least one processor;
   a control data receiving unit configured to receive, from the control apparatus, a first one of the control data calculated using the control model by the control apparatus using the at least one processor, and
   a control data selection unit configured to select the control data that is used for control on the facility, from the first one of the control data and a second one of the control data calculated by the calculation unit using the at least one processor.

2. The controller according to claim 1, wherein the control data selection unit is configured to select the second one of the control data, in response to the control data selection unit being unable to receive the first one of the control data from the control apparatus, using the at least one processor.

3. The controller according to claim 1, wherein
   the control data selection unit is configured to select control data calculated using the control model that is more recent, from the first one of the control data and the second one of the control data using the at least one processor.

4. The controller according to claim 2, wherein
   the control data selection unit is configured to select control data calculated using the control model that is more recent, from the first one of the control data and the second one of the control data using the at least one processor.

5. The controller according to claim 1, wherein
   the model receiving unit is configured to receive a plurality of the control models having different characteristics including at least one of a certainty of control, a calculation amount or a learning date and time, using the at least one processor, and
   the calculation unit is configured to select a control model that is used for control on the facility based on the characteristics, from the plurality of control models, using the at least one processor.

6. The controller according to claim 1, wherein
   the model receiving unit is configured to receive a plurality of the control models having different characteristics including at least one of a certainty of control, a calculation amount or a learning date and time using the at least one processor, and
   the calculation unit is configured to select a control model that is used for control on the facility based on the characteristics, from the plurality of control models using the at least one processor.

7. A control method comprising:
   receiving, by a controller, state data from at least one sensor configured to measure a state of a facility;
   transmitting, by the controller, the state data, which is a learning target, to a control apparatus configured to generate a control model by learning, the control model being configured to calculate control data for controlling the facility according to the state data;
   receiving, by the controller, the learned control model from the control apparatus;
   calculating, by the controller, the control data corresponding to the state data, which is a processing target, by using the received control model;
   controlling, by the controller, the facility by using the calculated control data;
   receiving, from the control apparatus, a first one of the control data calculated using the control model by the control apparatus; and
   selecting the control data that is used for control on the facility, from the first one of the control data and a second one of the calculated control data.

8. A non-transitory computer-readable medium having recorded thereon a control program that, when executed by a computer having at least one procesor, causes the computer to function as:
   a state receiving unit configured to receive state data from at least one sensor configured to measure a state of a facility using the at least one processor;
   a state transmission unit configured to transmit the state data, which is a learning target, to a control apparatus configured to generate a control model by learning, the control model being configured to calculate control data for controlling the facility according to the state data, using the at least one processor;
   a model receiving unit configured to receive the learned control model from the control apparatus using the at least one processor;
   a calculation unit configured to calculate the control data corresponding to the state data, which is a processing target, by using the received control model, using the at least one processor;
   a control unit configured to control the facility by using the calculated control data using the at least one processor;

a control data receiving unit configured to receive, from the control apparatus, a first one of the control data calculated using the control model by the control apparatus using the at least one processor, and a control data selection unit configured to select the control data that is used for control on the facility, from the first one of the control data and a second one of the control data calculated by the calculation unit using the at least one processor.

* * * * *